United States Patent [19]

Hanselmann et al.

[11] 4,158,247
[45] Jun. 19, 1979

[54] REAR WINDOW CLEANING APPARATUS FOR AUTOMOTIVE VEHICLES

[75] Inventors: Dieter Hanselmann, Aldingen; Hans Prohaska; Karl-Friedrich Schubert, both of Bietigheim-Bissingen, all of Fed. Rep. of Germany

[73] Assignee: ITT Industries, Inc., New York, N.Y.

[21] Appl. No.: 801,998

[22] Filed: May 31, 1977

[30] Foreign Application Priority Data

Jul. 30, 1976 [DE] Fed. Rep. of Germany ....... 2634271

[51] Int. Cl.² ............................................. B60S 1/08
[52] U.S. Cl. .............................. 15/250.3; 15/250.01; 15/250.19
[58] Field of Search ............. 15/250 A, 250 B, 250 C, 15/250.01–250.04, 250.19, 250.20, 250.21, 250.23, 250.16; D12/155; 40/129 C; 310/91, 66; 403/86, 160; 248/2, 14–16

[56] References Cited

U.S. PATENT DOCUMENTS

| | | | |
|---|---|---|---|
| 1,718,760 | 6/1929 | Quackenbush | 15/250.19 |
| 1,749,441 | 3/1930 | Oishei | 15/250.34 X |
| 1,944,260 | 1/1934 | Meyers | 15/250.36 X |
| 1,953,731 | 4/1934 | Thibault | 15/250.3 X |
| 1,964,400 | 6/1934 | Horton et al. | 15/250.3 |
| 1,998,760 | 4/1935 | Hueber | 15/250.16 X |
| 3,855,661 | 12/1974 | Prince | 15/250.01 |

FOREIGN PATENT DOCUMENTS

| | | | |
|---|---|---|---|
| 460550 | 5/1928 | Fed. Rep. of Germany | 15/250.3 |
| 2335356 | 2/1974 | Fed. Rep. of Germany | 15/250.3 |
| 2231212 | 12/1974 | France | 40/129 C |
| 909789 | 11/1962 | United Kingdom | 15/250.3 |

*Primary Examiner*—Peter Feldman
*Attorney, Agent, or Firm*—James B. Raden; William J. Michals

[57] ABSTRACT

A wiper assembly for cleaning the rear window of an automotive vehicle includes a closed housing in which the electromotor and the transmission for the swinging drive of the wiper shaft are located. The wiper shaft projects from a self-supporting housing portion at a predetermined distance from the fastening means. The unit can be mounted outside of the body of an automotive vehicle in a way that the wiper shaft points to the window to be cleaned and thereby a wiping angle of 180° can be attained.

2 Claims, 5 Drawing Figures

REAR WINDOW CLEANING APPARATUS FOR AUTOMOTIVE VEHICLES

BACKGROUND OF THE INVENTION

This invention concerns a cleaning equipment, especially for cleaning a rear window of an automotive vehicle, comprising a closed housing which may be mounted to the body by fastening means, said housing consisting of a supporting plate and a housing cover and receiving at least one electromotor and one transmission for a swinging drive of a wiper shaft projecting from the housing.

Wiper installations for automotive vehicles are already known, in which an electromotor as well as a gearing for a swinging drive of a wiper shaft are located in a common housing. The wiper shaft of these embodiments is mounted in a bush projecting from the housing, said bush having an external thread for a clamping nut. This unit is usually fixed to the body in the passenger compartment in a way that the wiper shaft penetrates the body near the lower edge of the pane. With such wiper installations wiping angles of 180° cannot be reached. Besides such units can in most cases not be used for cleaning the rear window of an automotive vehicle because in the passenger compartment near the lower edge of the rear window is no sufficient space available for the unit.

In order to avoid these disadvantages because of that reason a wiper installation was already developed in which the wiper motor with the gearing is located in a frame construction also receiving the wiper in the rest position, said frame construction fastened between the toroidal rubber holding the rear window and the vehicle body. Thereby a wiping angle of 180° can be achieved, because the wiper shaft is located in the area of the pane to be cleaned. However, this embodiment did not succeed in practice, because of the fastening on the toroidal rubber of the pane to be cleaned the motor and the voliminous frame construction are also located in front of the rear window and thereby considerably influencing and obstructing the view.

SUMMARY OF THE INVENTION

This invention is based on the problem to develop a constructional unit as mentioned above in a way that it may easily, but reliably be fastened to the outside of the body, whereby large wiping angles are to be realized without substantially influencing the view. This problem is solved according to the invention in that the wiper shaft is projecting from a self-supporting housing portion at a distance from the fastening means.

A constructional unit formed in such a manner can be directly fastened from the outside to the body wall adjacent to the pane in a way that the self-supporting portion with the wiper shaft extends into the area of the pane to be cleaned, so that wiping angles of 180° are possible.

The free end of the wiper shaft can thereby point off from the pane to be cleaned, but according to an advantageous development of the invention an improved embodiment is achieved, when the fastening means are attached to the supporting plate and the wiper shaft projects from the supporting plate, thus with its free end points towards the pane to be cleaned. Thereby the wiper shaft is covered by the self-supporting portion of the housing, whereby a pleasing appearance but also an advantage with respect to safety is given, because projecting parts representing a cause of danger are avoided.

According to an advantageous development of the invention the supporting plate has two portions, whereby the fastening means are arranged in a first portion and the wiper shaft projects from the second portion, which in comparison to the first portion is staggered by approximately the length of the part of the wiper shaft projecting from the supporting plate. By staggering of the portion bearing the wiper shaft the possibility is provided to install the unit also in such vehicles the pane of which is surrounded by a relatively thick toroidal rubber. When the shape of the first portion of the supporting plate is adapted to the shape of the wall of the body directly adjacent to the edge of the pane the unit may be directly fastened to said wall of the body, whereby a large surface support and a stable anchoring is given. In the interest of a universal use of the unit the first portion of the supporting plate will be formed essentially plane and the supporting plate will be mounted to the wall of the body by means of an adapter member adapted to the wall of the body. Then only the adapter members have to be exchanged for the different models of vehicles.

A particularly space saving embodiment which influences the view little is achieved, when the supporting plate has at least nearly triangular outline, whereby in the first portion the motor is preferably arranged along the one base edge and the wiper shaft is arranged at a small distance from the apex opposite of this edge. Such an embodiment has the advantage that the fastening means apply near the strong point of the unit and the self-supporting portion of small extension does not cause too long pitching moments during vibration of the vehicle.

According to an advantageous development of the invention the housing can receive at least parts of a washing installation, for instance a pump and eventually also a liquid container. If then a nozzle is also fixed directly to the housing, a compact unit which can be easily mounted and only has to be connected to the electrical wiring of the automotive vehicle is disposable.

BRIEF DESCRIPTION OF THE DRAWING

The invention is described below by way of the embodiment shown in the accompanying drawings, in which.

DETAILED DESCRIPTION

Figure 2:
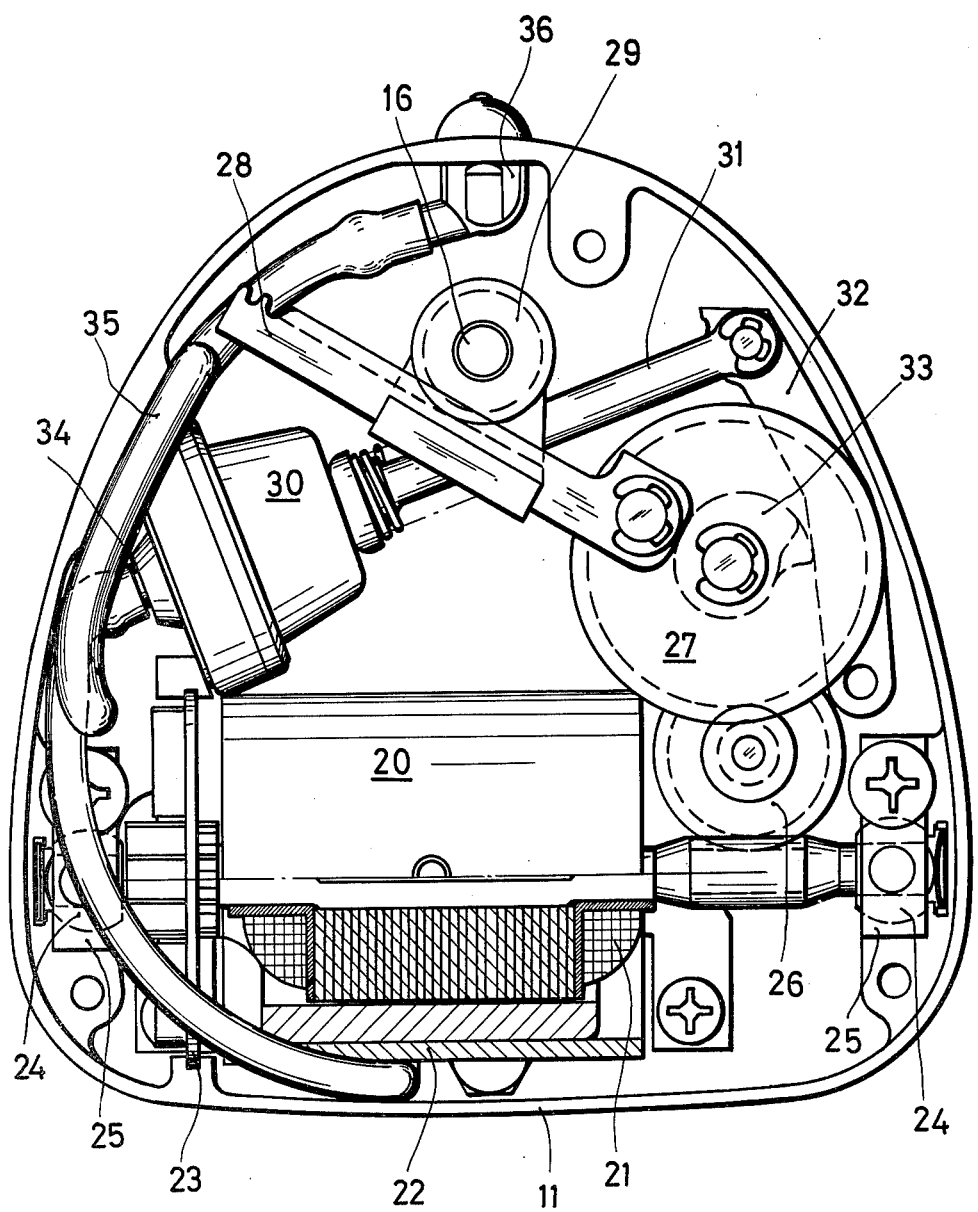
FIG. 2 is a cross-section through the unit.

The wiper and washer installation executed as a compact constructional unit has a housing 10 which is composed of a supporting plate 11 and a housing cover 12. The supporting plate 11 and the housing cover 12 have-as FIG. 2 clearly shows-an at least triangular outline with rounded off edges. In a first portion 13 thread bolts 14 and 15 are tied on the supporting plate 11. At a distance of these thread bolts serving as fastening means the wiper shaft 16 projects from a second portion 17 of the supporting plate which in comparison to the first portion is staggered by the dimension d, which approximately corresponds to the length of the part of the wiper shaft 16 projecting from the supporting plate 11.

The electromotor 20 with the armature 21, the stator 22 and the carbon brushes 23, is arranged along the one base edge of the housing 10. The armature shaft is mounted in calotte type bearings 24 which are secured to the supporting plate 11 by means of corresponding clamps 25. The gearing for a swinging drive of a wiper shaft 16 in well-known manner consists of a gear wheel 26, a crank disc 27, a toothed rack articulated to it and a second gear wheel 29, which is tensionally connected with the wiper shaft 16. In the housing 10 a rubber bellows pump 30 is located which is actuated by a spring-loaded driver rod 31, which via a lever 32 is driven by a cam disk 33 tensionally connected with the crank disk 27. The rubber bellows pump 30 supplies washing liquid from a liquid container not shown via the delivery pipe connecting piece 34 and the fluid pipe 35 to a nozzle 36 which is locked on the supporting plate 11.

Figure 1:
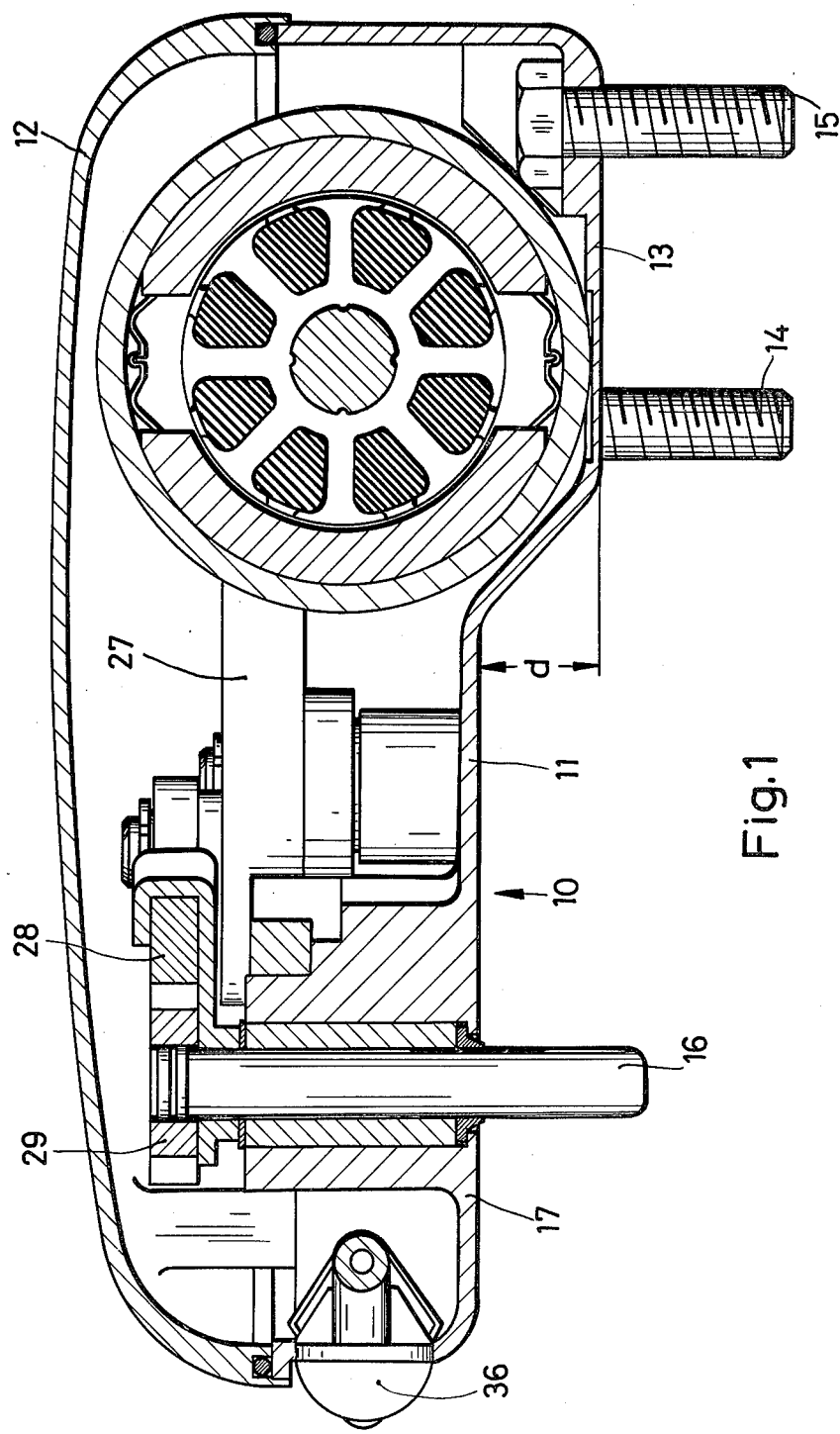
FIG. 1 is a longitudinal section through a unit comprising wiper and washer installation.
Figure 3:
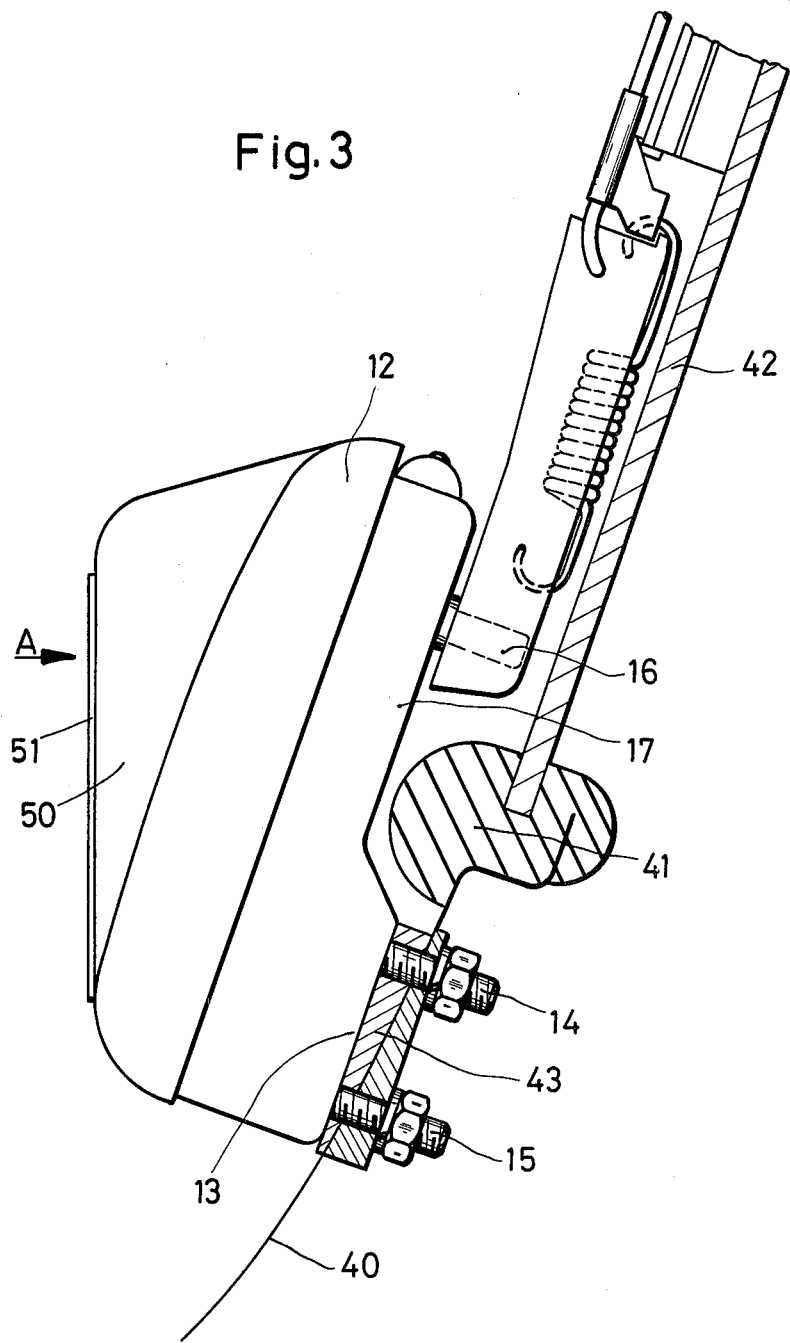
FIG. 3 is a side view of another embodiment mounted on the body of the vehicle.
Figure 4:
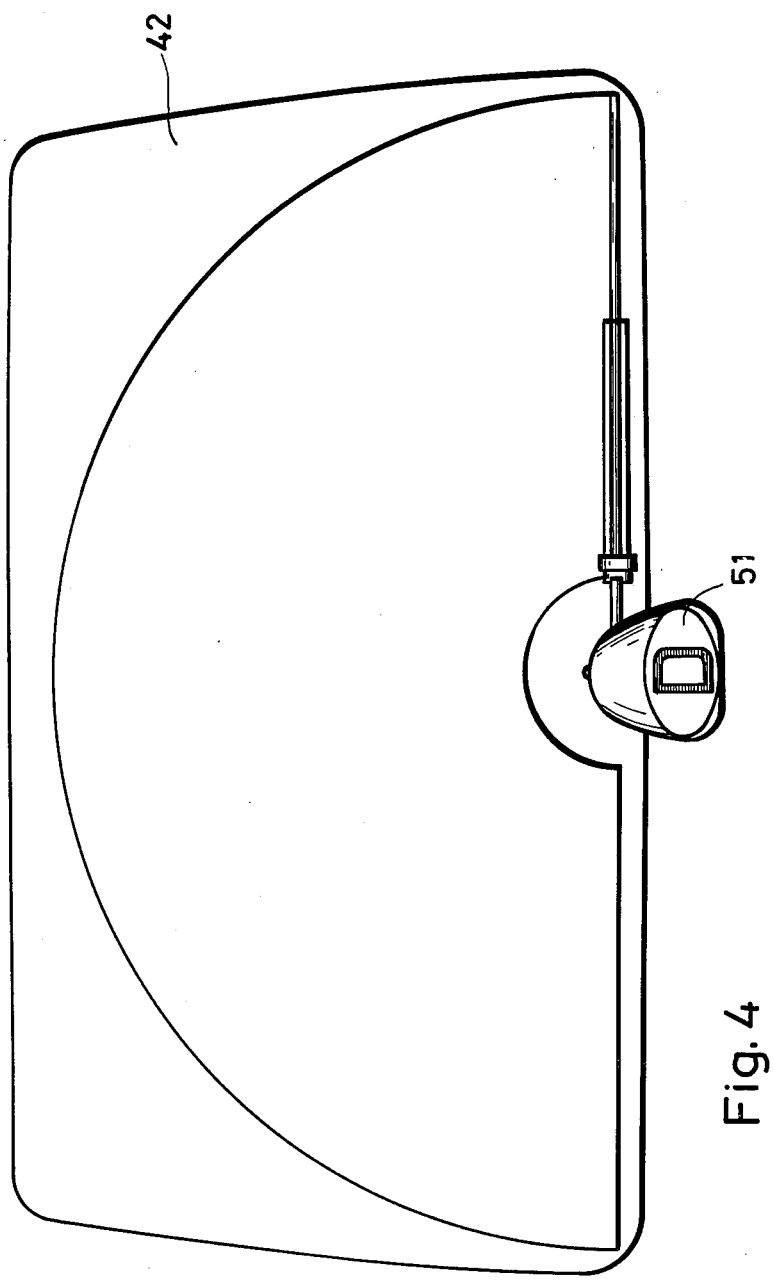
FIG. 4 is a view in direction of arrow A in FIG. 3.

As FIG. 3 shows the unit is secured to the outside of the body 40 directly at the lower edge of the pane 42 held by a toroidal rubber 41. Thereby the embodiment shown in the drawing is provided with an adapter member 43, the shape of which on the one hand is adapted to the shape of the first portion 13 of the supporting plate 11 and on the other hand to the body 40. Thereby a large surface support is achieved. The wiper shaft 16 with its free front side points to the pane 42 to be cleaned, thus towards the outside is covered by the housing. As FIG. 4 shows thereby a wiping angle of 180° can be achieved, so that large areas of the pane 42 can be wiped. FIG. 3 illustrates that the staggered second portion 17 of the supporting plate borders on the first portion 13 in an area which is located in the plane of the toroidal rubber 41. Even if this toroidal rubber has a thick wall because of the staggered type supporting plate 11 no fastening problems arise. In the unit according to FIG. 3 differing from the embodiments shown in FIGS. 1 and 2 the housing cover 12 is formed in a way that at least one partial area 50 in the operating position is vertically arranged. In this partial area of the housing cover 12 a signboard 51 is fastened, for instance a country's identification sign.

Figure 5:
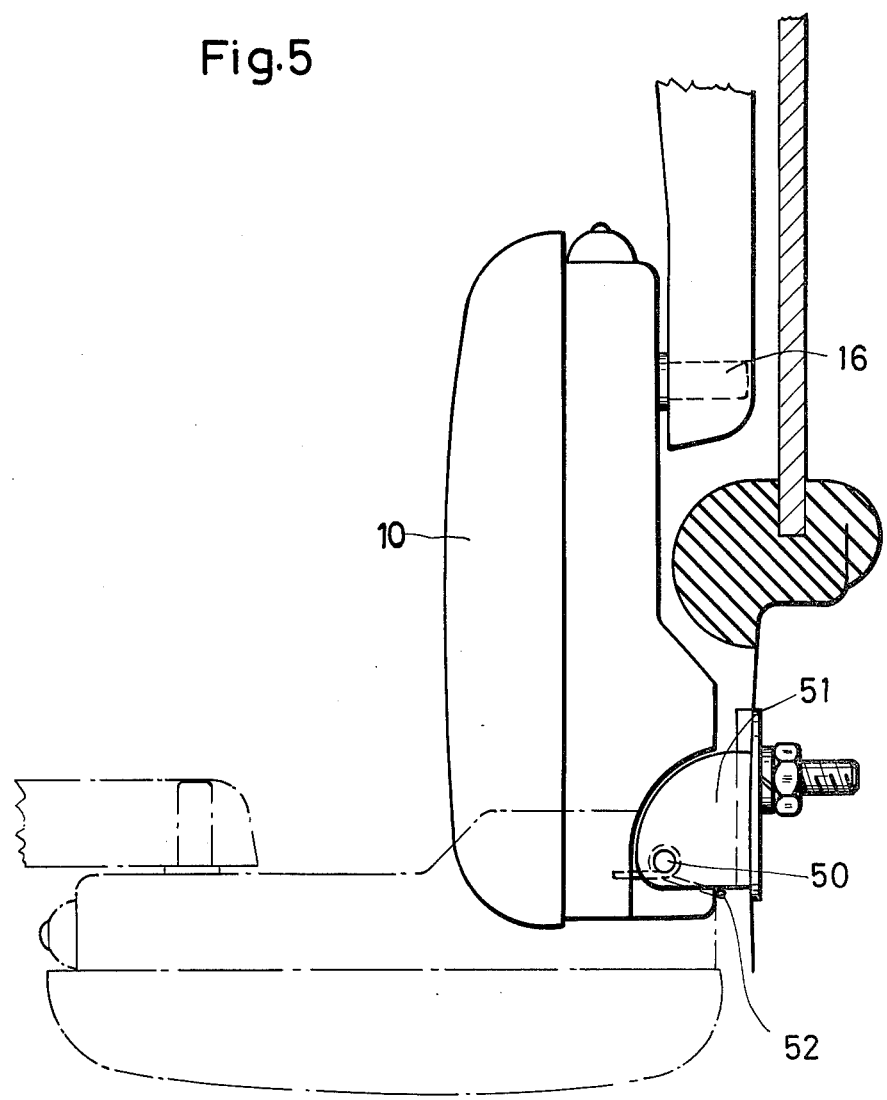
FIG. 5 is a side view of a further embodiment.

In the embodiment according to FIG. 5 the housing 10 by means of a bolt 50 is rotatably mounted to a U-shaped frame 51, which may be secured to the body of the automotive vehicle. A spiral spring 52 presses the entire housing with wiper shaft 16 towards the pane to be cleaned, so that the hinge part of the wiper arm with the tension spring can be saved. The entire housing can be tilted into the position indicated in the drawing by the dotted line and can be locked in this position.

Instead of a rack-and-pinion gear also a crank drive or a belt drive could be used. The latter has the advantage that the wiper shaft 16 can be preferably located at the tip of the housing which is of advantage because then the view through the window to be cleaned is influenced less and no reduction of the wiping angle has to be accepted. Finally the gearing could be completely avoided, when the wiper shaft 16 is directly driven by a drive motor the direction of rotation of which is reversible.

Instead of the rubber bellows pump 30 also a diaphragm pump or centrifugal pump could be used which may be driven by the drive motor 20 via a coupling. Thereby this coupling could be controlled via a solenoid valve, in order to provide that the wiping installation can be actuated independently of the washing installation. Finally it would be imaginable additionally to install a program control equipment, in order to provide that during each operating process of the cleaning equipment a certain number of wiping cycles and a corresponding number of washing processes are executed.

The cleaning equipment described distinguishes itself by a particularly simple and compact construction, which because of the inventive arrangement of motor and wiper shaft can be secured at the edge of the pane very safely and reliably, so that the wiper shaft points to the pane to be cleaned and thereby a wiping angle of 180° can be realized without considerably influencing the view through the window to be cleaned.

What is claimed is:

1. Apparatus for cleaning the rear window of an automotive vehicle wherein said window is mounted within the general plane of the rear frame of the vehicle and separated therefrom by a toroidal gasket which encircles said window and engages said frame and said window, said apparatus comprising, in combination:
    a housing rigidly mounted to said frame on an external surface thereof and extending outwardly from said frame, said housing having a projection extending over said gasket and into the area of said window;
    a motor mounted in said housing;
    a wiper shaft mounted in said projection of said housing and extending toward said window;
    means for mechanically coupling the output of said motor to said wiper shaft for rotating said shaft through an oscillatory angular swing in response to said output of said motor; and,
    wherein said projection is spaced apart from said plane of said rear frame a distance at least equal to the outward extension dimension of said gasket thereby to provide clearance for said gasket.
2. The apparatus according to claim 1, wherein said wiper shaft rotates through an angle of 180°.

* * * * *